United States Patent [19]

Weikel

[11] Patent Number: 5,044,651
[45] Date of Patent: Sep. 3, 1991

[54] FIFTH WHEEL HITCH MOUNTING MECHANISM ENABLING TOWING AND TURNING IN A TIGHT RADIUS

[76] Inventor: John D. Weikel, Rte. 6, Box 899, Beaumont, Tex. 77705

[21] Appl. No.: 565,465

[22] Filed: Aug. 10, 1990

[51] Int. Cl.⁵ .............................................. B62D 53/08
[52] U.S. Cl. ................................... 280/407; 280/441; 280/901
[58] Field of Search .................... 280/407, 438.1, 439, 280/441, 441.2, 901

[56] References Cited

U.S. PATENT DOCUMENTS

| | | |
|---|---|---|
| 2,548,085 | 4/1951 | Weiss . |
| 2,807,477 | 9/1957 | Tuso ................................ 280/438.1 |
| 3,826,516 | 7/1974 | Weber ................................. 280/407 |
| 3,955,831 | 5/1976 | Whitchurch ..................... 280/456.1 |
| 4,148,498 | 4/1979 | Taylor, Jr. .......................... 280/482 |
| 4,240,647 | 12/1980 | Lewis ................................. 280/482 |
| 4,429,892 | 2/1984 | Frampton et al. ............... 280/438.1 |
| 4,611,821 | 9/1986 | Jeanson et al. ...................... 280/482 |

FOREIGN PATENT DOCUMENTS 139768 6/1987 Japan .................................. 280/441

Primary Examiner—Kenneth R. Rice
Assistant Examiner—Mitchell Bompey
Attorney, Agent, or Firm—Gunn, Lee & Miller

[57] ABSTRACT

This is directed to a mounting mechanism for supporting a fifth wheel hitch on the bed of a pickup truck. In incorporates a fixed framework which is ideally bolted to the bed of the pickup. It has a pair of lengthwise facing guide rails which are spaced from one another and extend toward the rear of the truck parallel to the centerline of the truck. That supports on a set of rollers a slidably mounted and movable mounting means so that the mounting means can travel along the facing guide rails. Moreover, the mounting mechanism receives a fifth wheel hitch mechanism thereon. The mounting mechanism is held in the forward most position by means of a latch means which hooks against the mounting means and holding it. The latch means is optionally defeated by an extending lever positioned and located so that it is moved by the trailer mechanism during turning whereupon the slide mechanism moves the trailer toward the rear of the truck.

10 Claims, 3 Drawing Sheets

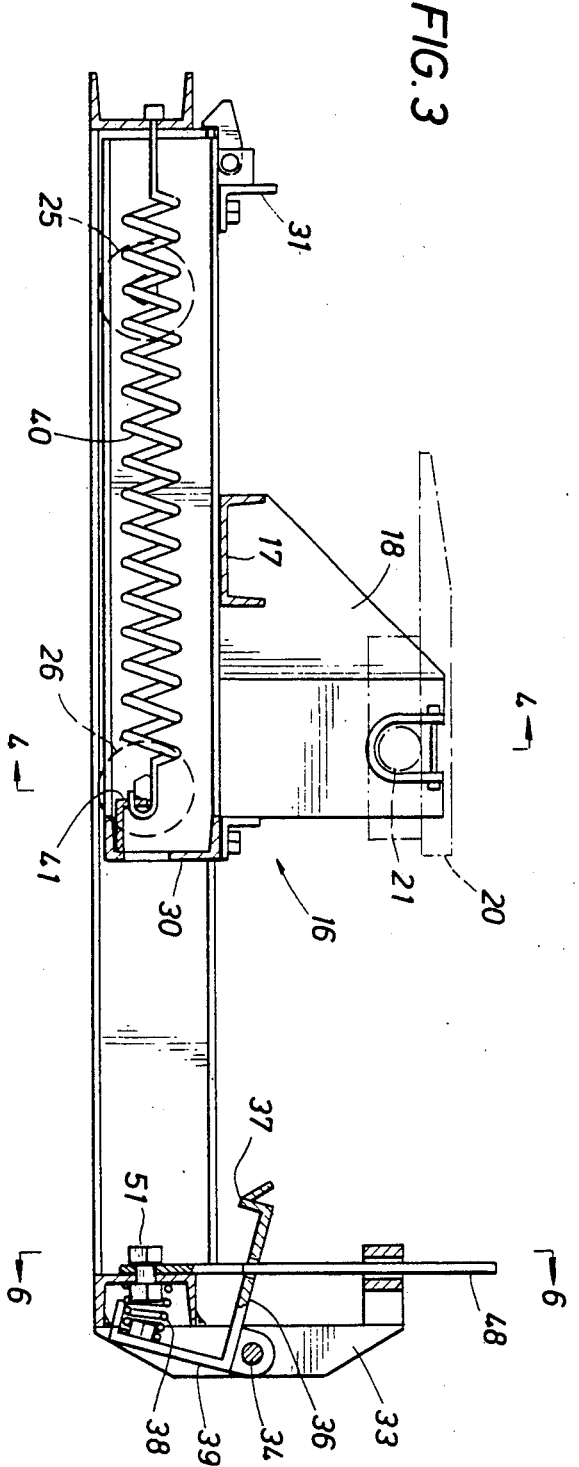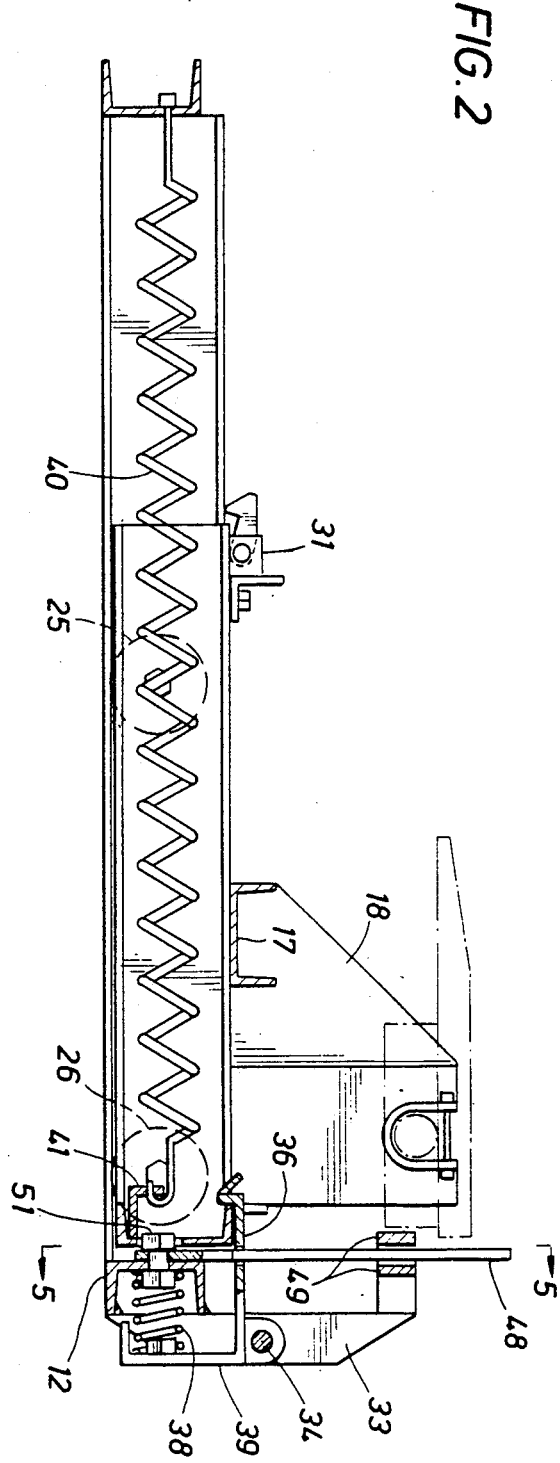

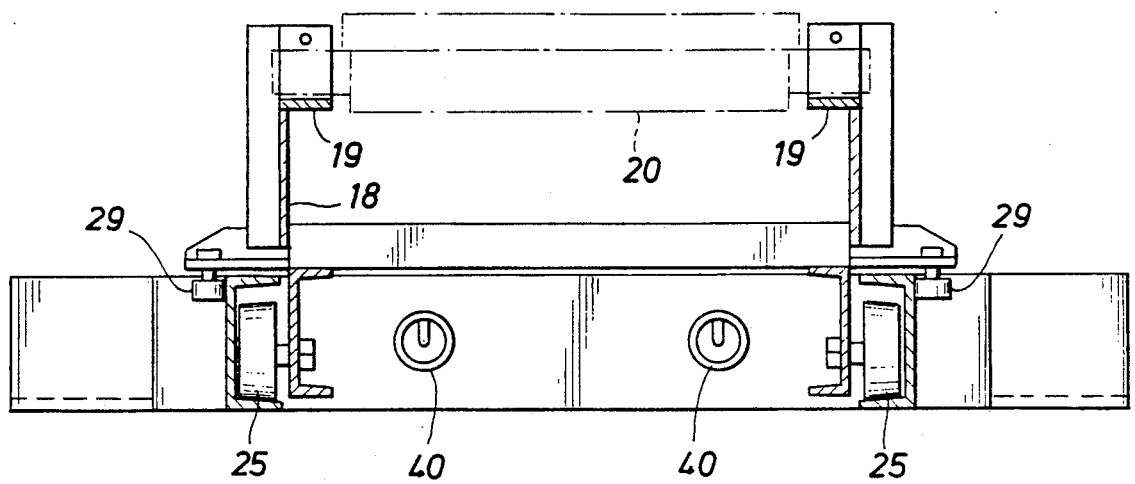
FIG. 4
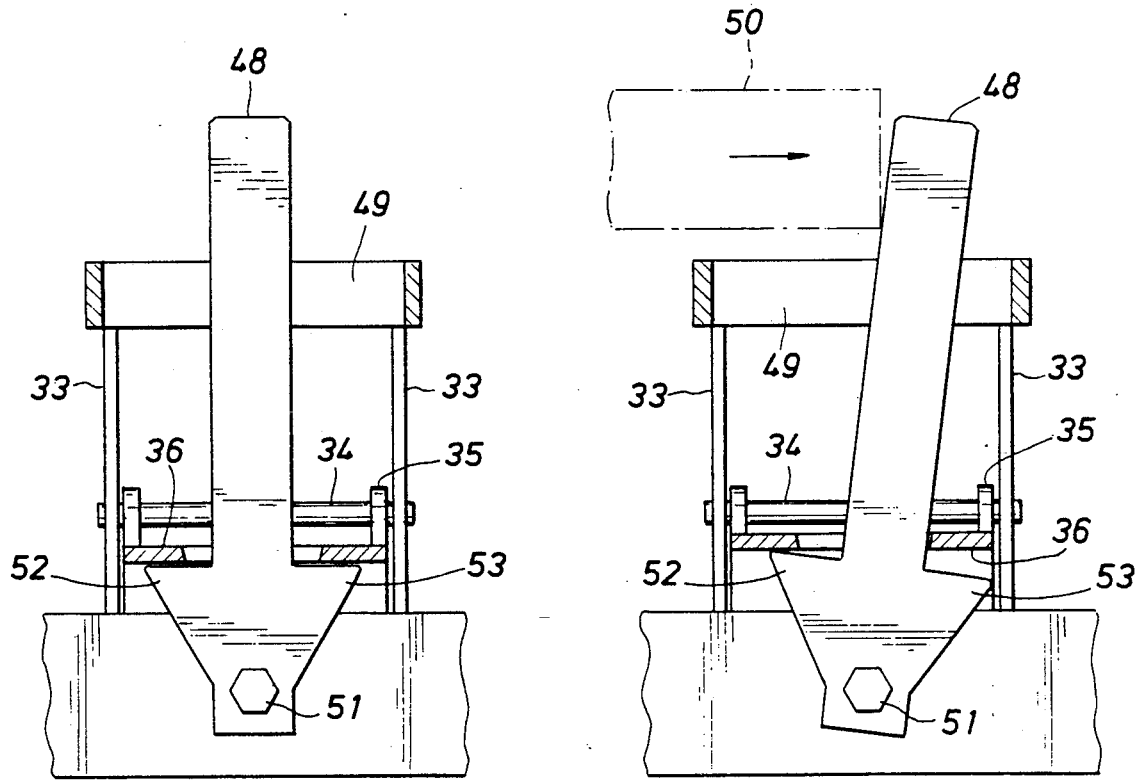
FIG. 5
FIG. 6

FIFTH WHEEL HITCH MOUNTING MECHANISM ENABLING TOWING AND TURNING IN A TIGHT RADIUS

BACKGROUND OF THE DISCLOSURE

The present disclosure is directed to a fifth wheel hitch mounting mechanism which enables a pickup truck or other tow vehicle to pull a trailer which is connected with the towing vehicle by a fifth wheel hitch. It particularly finds application in a circumstance involving the below described situation, preventing or limiting damage or harm to both the towing vehicle and the trailer.

It is not uncommon to tow a trailer with a pickup truck. In particular, there are recreational vehicle (RV) trailers which are towed by means of a fifth wheel hitch where the fifth wheel hitch is mounted in the bed of a pickup truck and connects with a gooseneck extending from the RV into the pickup bed. Typically, the bed mounted apparatus is bolted in place but can be readily be removed should the pickup be converted for hauling other types of cargo. Several different sized gooseneck trailers are available where the trailer is substantially wide, perhaps as much as eight feet in width, and the wide portion thereof is relatively close to the forward tip of the gooseneck which is connected to the fifth wheel to permit pivoting. A typical pickup truck can have substantial width, perhaps six or seven feet in width at the cab. Considering both a full width pickup truck and a full width trailer where the gooseneck and fifth wheel hitch connection is somewhat close to the cab, there is a possibility of collision between the truck and trailer in a sharp turn. One of the primary reasons for the popularity of the gooseneck connected with a fifth wheel hitch is that the position of the hitch shortens the truck and trailer in contrast with the traditional bumper mounted trailer hitch. If the truck and trailer are closer together, tracking is much more stable. Ride stability is enhanced by placing the trailer weight forward of the rear bumper and especially if the weight is forward of the rear axle.

In the instance where a gooseneck is affixed to a trailer and is supported on a fifth wheel hitch mounting mechanism in the bed of a pickup truck, when sharp radius turns are made, there is the possibility that the back corners of the pickup cab will bang against the forward corners of the trailer. This limits the steering radius and reduces turning maneuverability. This particularly comes into play at the time that the trailer is parked which involves sharp maneuvering on the part of the driver by backing and turning. When this occurs, substantial body damage can occur either to the truck or the trailer, or perhaps to both. This can be avoided by mounting the fifth wheel hitch farther back on the pickup truck. When this occurs, however, there is an undesirable effect, namely that the truck and trailer combination is longer and somewhat more unwieldy.

The structure of the present disclosure provides a fifth wheel hitch mounting which in the ordinary operation positions the fifth wheel hitch as close as possible to the rear axle of the pickup truck. This enhances maneuverability and tracking during forward motion. It is, however, constructed so that the fifth wheel hitch mounting moves rearwardly at the time of a sharp turn. This elongates the trailer connection, increasing the space between the cab of the pickup truck and the superstructure of the trailer. This prevents accidental collision between the truck cab and the trailer. This then permits the driver to turn as sharply as possible in maneuvering the trailer, typically encountered when parking the trailer at a desired location. This shift in mounting is automatically accomplished so that the fifth wheel hitch moves rearwardly in the pickup truck bed and changes connection spacing. An automatic trigger mechanism is included which accomplishes this. The fifth wheel hitch then is locked in the rear most position.

Accordingly, the present disclosure is briefly summarized as a fifth wheel hitch mechanism for relocating a fifth wheel hitch mechanism in the bed of a pickup truck. It has a forward position which shortens the connection between the truck and trailer and a rearward position which elongates the connection spacing so that collision is prevented. The structure is bolted, welded or otherwise anchored in the bed of a pickup truck, and to that end, it comprises a pair of elongate fixed rails. There is a rail mounted and moveable slide mechanism thereabove which can travel forwardly or rearwardly. A latch mechanism is also included which can latch in the forward position, or can release enabling movement to the rearward position. This automatically permits the system to shift during transit, for instance, when the driver elects to terminate a long trip on the open highway by pulling into a specific location to park the trailer. For the long drive, the connection between truck and trailer is over the rear axle and yet, when the driver begins to turn sharply while maneuvering the trailer to a parked position, the device shifts on sharp turning so that the fifth wheel hitch mounting mechanism moves the gooseneck connection to the rear, thereby avoiding collision between the cab of the truck and the superstructure of the trailer during the sharp turns.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a sectional view taken along the line 2—2 of FIG. 1 through the mounting apparatus of the present disclosure and further showing the fixed rails and a sliding mechanism which are latched in the forward position;

FIG. 3 is a view similar to FIG. 2 showing the slide mechanism moved to the left or to the rear of the pickup truck for elongation of the connection between the truck and trailer;

FIG. 4 is a sectional view through the structure shown in FIG. 3 taken along the line 4—4 and illustrating details of construction of rollers and rails which support the slide mechanism for movement;

FIG. 5 is a sectional view taken along the view 5—5 of FIG. 2 showing a latch mechanism which is normally latched, and which holds the slide mechanism in the forward most position; and FIG. 6 is a view similar to FIG. 5 taken along the line 6—6 of FIG. 3 showing the same latch mechanism which has been released in FIG. 3 and further showing how release occurs to permit the slide mechanism to move rearwardly.

DETAILED DESCRIPTION OF THE PREFERRED EMBODIMENT

Figure 1:
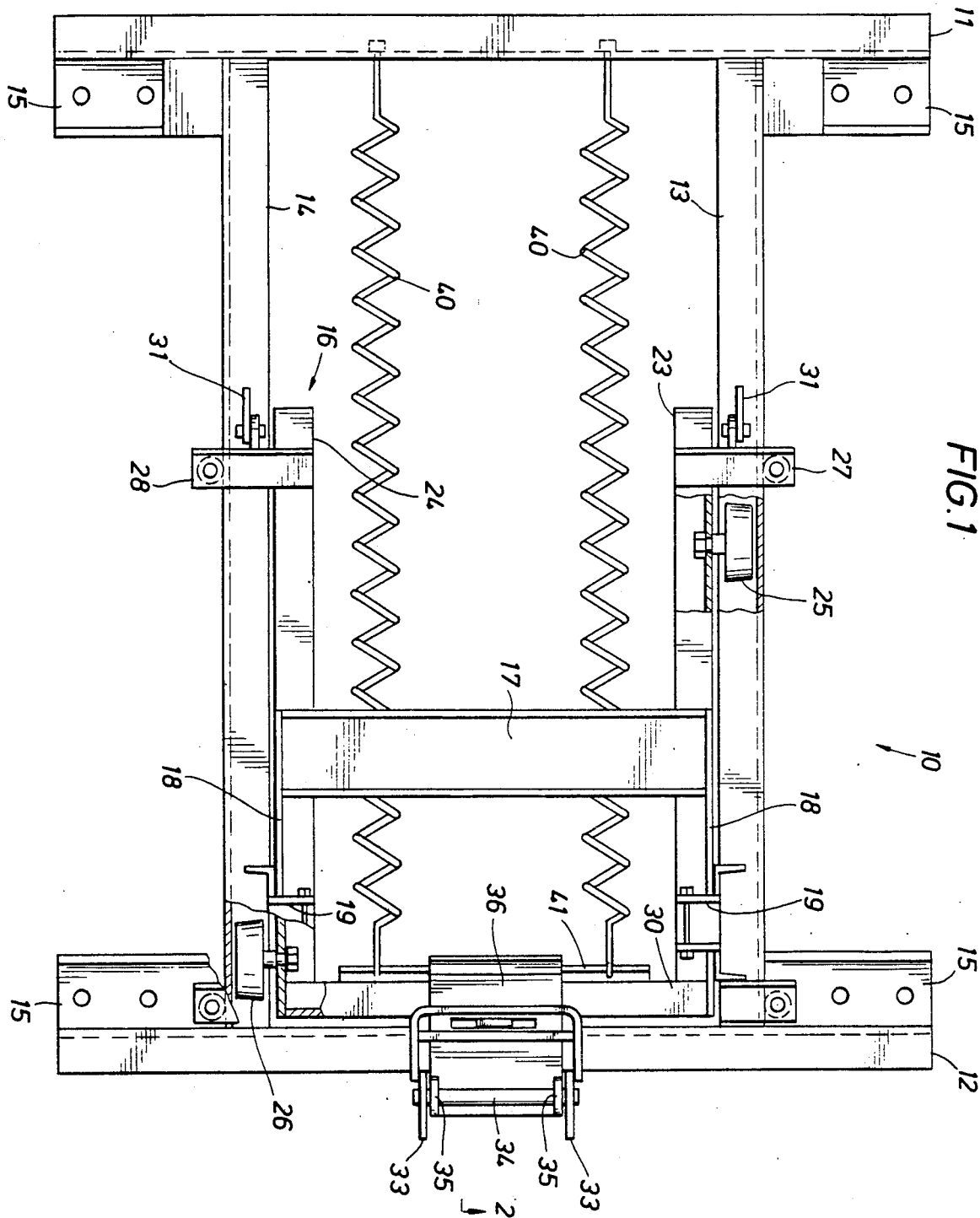
FIG. 1 is a plan view of the fifth wheel hitch mounting mechanism of the present disclosure showing a set of fixed rails mounted in the bed of a pickup truck to place the weight near the rear axle and further including a slide mechanism thereon where the slide mechanism is latched in a forward position.

Going now to FIG. 1 of the drawings, the numeral 10 identifies the mounting mechanism of the present disclosure. It is intended to be bolted, riveted, welded or otherwise anchored to the frame through the bed of a pickup truck. It is normally centered between the left and right sides, and it is preferably positioned to place the weight over the rear axle to shorten the connection. It is intended for use with a gooseneck trailer (not shown) which connects with the mechanism 10 by means of a fifth wheel. A fifth wheel mechanism is believed to be well known also. The gooseneck trailer has an appended overarching frame member which extends forwardly and connects with the fifth wheel mechanism. While the structure of FIG. 1 supports the gooseneck trailer by means of the fifth wheel mechanism, the fifth wheel hitch is mounted in a fashion to be described and particularly illustrated in dotted line in FIGS. 2 and 3. The description, however, will focus primarily on FIG. 1 and then the remainder of the disclosure.

FIG. 1 shows four frame members. They are anchored to the bed of the pickup truck. To this end, there is a rearward frame member 11 which is a flanged structural frame member and a similar flanged frame member 12 at the forward end. They are parallel to one another and are spaced apart to support lengthwise frame members 13 and 14 which are identical and symmetrically located on the left and right of the equipment. The frame members 13 and 14 define a rectangular frame which is anchored in place by means of suitable bolts through protruding flanges at 15 at several locations on the structure.

In the preferred embodiment, the four frame members have a pair of protruding flanges and an upstanding web member therebetween. The frame members 13 and 14 face one another, meaning that the flanges are open toward one another to define a rail or track system. The frame members 13 and 14 support a moving slide mechanism indicated generally at 16. The slide mechanism is at the right hand extremity of movement as shown in FIGS. 1 and 2 while it has moved to the left hand extremity of movement in FIG. 3. The slide mechanism includes a transverse spacing bar 17 which is formed of channel stock and it supports a pair of upstanding gusset plates 18. These gussets support semicircular receptacles or notches 19, and by means of a suitable bolt as shown in FIGS. 2 and 3, a fifth wheel 20 can be anchored in position. The fifth wheel is free to pivot as will be observed in FIGS. 2 and 3. The fifth wheel is constructed for rotational movement on the trunnions 21 which fit in the mating semicircular notches 19 shown in FIG. 1. The fifth wheel mechanism is conventionally a purchased item which is installed on the slide mechanism 16 shown in the drawings. Continuing with FIG. 1, however, the slide mechanism 16 also is constructed with duplicate runners 23 and 24 which are parallel to one another and which are positioned inboard of the frame members 13 and 14. The runners 23 and 24 extend parallel to the frame members so that rollers can extend between the flanges of the frame members 13 and 14. Thus, the two runners 23 and 24 support two guide rollers each, and the rollers are at the opposite ends of the runners. This positions four rollers clamped between the flanges of the frame members 13 and 14. The back rollers 25 are similar to the front rollers 26 and differ primarily in location. In both instances, the rollers engage the lower flanges and are free to rotate on short stub shafts which mount the rollers for freewheeling movement. They support the weight of the slide mechanism 16; they enable its movement to and fro with reduced drag or friction, the rollers providing rolling support for the slide mechanism 16.

The runners include protruding tabs 27 and 28 at the back end of the runners which extend across, over and above the frame members 13 and 14; they position limiting rollers 29 against the frame members 13 and 14 to prevent wobble to the left and right as viewed in FIGS. 1 or 4. These outboard rollers are replicated at all four corners of the slide mechanism. This therefore positions the rollers 29 in a clamping position relative to the main guide rollers 25 and 26 which are on the interior of the rails 13 and 14. Both sets of rollers guide the slide mechanism 16 along the frame members 13 and 14. The runners 23 and 24 are joined by the transverse frame member 17 which is approximately at the middle portions thereof, and a similar transverse frame member 30 spans between the runners 23 and 24. The frame member 30 is better shown in FIGS. 2 and 3 of the drawings. This frame member is joined to the gussets 18 which extend upright from the structure and further assist in defining a rectangular framework for the slide mechanism 16.

As shown in FIGS. 2 and 3, the runners 23 and 24 support rearwardly pointed latches 31 which reach over and latch against the back end of the frame members 13 and 14. As observed in the plan view of FIG. 1, the latches 31 are located so that they can latch at the left hand extremity of movement by reaching over the top and hooking. Preferably, theses are latches which are gravity engaged or hand released so that the slide mechanism 16 can be locked at the extreme position of movement.

Going now to FIGS. 2 and 3 of the drawings considered jointly, the frame member 30 moves toward or against the frame member 12. The frame member 12 has a pair of upstanding parallel support plates 33 welded to it and which extend upwardly. The upstanding plates 33 (see FIG. 1) support a horizontal shaft 34 which serves as a pivot. That shaft in turn supports upstanding perforated tabs 35, a horizontally extending latch 36 which has an end located downwardly extending tang 37 which reaches over and latches the frame member 30, holding the slide mechanism 16. In other words, latching is possible when the slide mechanism 16 is to the right as viewed in FIGS. 1 and 2 while FIG. 3 shows the latch rotated about the shaft 34. The latch 36 is urged to the position of FIG. 2 by means of a compression spring 38 better shown in FIGS. 2 and 3. The spring compresses against the inside web surface of the frame member 12, and bears against an L-shaped extension 39 attached to the latch 36. The contrast between FIGS. 2 and 3 shows the latch 36 rotated from a hooked position of FIG. 2 to a position in FIG. 3 which permits the slide mechanism to move. Latch rotation in the extent and manner illustrated accomplishes slide and release. The slide mechanism is pulled to the left by means of duplicate coil springs 40. They are anchored at the left hand end on the transverse frame member 11 and extend to the transverse frame member 30 which comprises a portion of the slide mechanism. The frame 30 is typically made of channel stock and has an L-shaped bracket 41 welded on the inside of the channel. This permits the ends of the resilient coil springs to engage the slide mechanism 16 and pull it to the left as best illustrated in the contrast between FIGS. 2 and 3.

Attention is now jointly directed to FIGS. 5 and 6 of the drawings. An upstanding release lever 48 is shown in both views. The lever 48 extends upwardly as also shown in FIGS. 2 and 3 and is captured between a pair of guide members 49 which bracket the lever. The lever is supported on a bolt 51 for movement in response to striking the lever by the means 50 shown in FIG. 6 which is associated with the connected fifth wheel base and gooseneck connection. Protruding means 50 is rotated so that the lever is moved from the vertical or upright position of FIG. 5. Moreover, the lever is normally upright and is held in that position by left and right cams 52 and 53. These two cams contact the latch 36 at the nether side. This is shown in FIGS. 2 and 3 as well as FIGS. 5 and 6. The latch 36 has a slot in it which accommodates the lever 48 which extends upwardly through the slot. The slot aligns the lever 48 in the upright position; when bumped, the lever 48 is forced to the left or right, rotating about the shaft of the bolt 51 and one of the lever supported cams bears against the latch 36, and causes it to rotate. This is shown in the contrast between FIGS. 5 and 6. The cam 52 is forced against the latch 36 to raise the latch, see FIG. 3. When raised, the tang 37 disengages the slide mechanism. It then pulls to the left at the urging of the coil springs 40. It rolls to the left on the rollers 25 and 26 previously described. The lever returns to the upright position because the coil spring 38 tends to restore the latch to the horizontal position of FIG. 2. Accordingly, the lever can be bumped, deflected to the side, and then will resiliently return to the upright position in the ordinary operation.

Operation of the system should be considered. When there is no trailer connected, the equipment simply rests in the pickup truck bed. When a hitch head 20 of the hitch mechanism is attached by means of the trunnions which support it, the fifth wheel hitch mechanism is then in position for connection with a trailer. Moreover, the slide mechanism is moved to the right hand extremity of movement and is held in that location by the latch 36 which reaches over the top of and locks with the tang 37, thereby securing against the frame member 30. In other words, the slide mechanism is then held in position. In that circumstance, a trailer connected by means of the fifth wheel can be towed. The connection between the truck and trailer is centered over the rear axle to provide enhanced stability in trailering. However, should sharp turns be made, the relative rotation which occurs at the fifth wheel will bring a protruding tab 50 into contact with the upstanding lever 48 as illustrated in FIG. 6 of the drawings. When this rotation is great, the lever is so engaged to cause release. The lever 48 is moved to one side or the other, bringing the cams into play, thereby raising the latch 36. When the latch 36 is forced upwardly as illustrated in FIG. 3 of the drawings, the slide mechanism is then released. The coil springs 40 (in tension) pull the slide mechanism toward the rear of the mounting mechanism 10. At this juncture, the latches 31 are locked by gravity in the down position. These latches can be hand released as desired. Ordinarily, this permits the slide mechanism to move to the left or back to the right as desired. As a generalization, the slide mechanism 16 moves to the left during sharp or vigorous turning of the sort encountered when parking the trailer. The movement of the slide mechanism 16 is best illustrated in the contrast between FIGS. 2 and 3; this carries the trailer sufficiently away from the cab of the truck that the risk of accidental collision between the upstanding cab and the upstanding trailer near the gooseneck is reduced, and collision is thereby avoided. This helps protect the equipment and prevent damage during a turn. Indeed, the risk of accidental contact is substantially reduced. When the slide mechanism 16 is unlatched as illustrated in FIG. 3, such unlatching occurs as a result of the movement of the truck, turning sharply either to the left or right relative to the trailer during parking. When that exercise has been finished, the slide mechanism can be forced back to the latched position of FIG. 2 by simply lining up the truck and trailer so that backing of the truck of perhaps one or two feet will accomplish relatching. When this happens, relatching does automatically occur. In other words, the truck driver does not have to dismount from the truck and tend to this matter by hand. It is desirable, however, that the latches 31 be gravity set and hand released. This provides a hand operated override which the truck driver may want to use from time to time.

While the foregoing is directed to the preferred embodiment, the scope thereof is determined by the claims which follow.

What is claimed is:

1. A fifth wheel mounting mechanism enabling a towing pickup truck to pull a gooseneck trailer supported by the fifth wheel mechanism, comprising:
    (a) a fixed framework mountable in the bed of a pickup truck;
    (b) frame guide means extending rearwardly of the pickup truck to define forward and rearward positions relative to the truck;
    (c) mounting means for supporting a fifth wheel slidably mounted for movement between the rearward and forward positions;
    (d) means for releasably locking said slidable mounting means to prevent sliding movement thereof; and
    (e) wherein said releasable locking means comprises a hook pivotally mounted and urged by resilient spring means for reaching over and engaging said mounting means to lock said mounting means in a specific location along said frame guide means; and
    (f) further including means for releasing said hook.

2. The apparatus of claim 1 wherein said fixed frame work includes a pair of spaced lengthwise frame members having guide surfaces thereon wherein said frame members are positioned lengthwise extending toward the rear end of the pickup truck and comprise said frame guide means and spaced locations thereon define the forward and rearward positions.

3. The apparatus of claim 2 wherein said frame members are supported by transverse frame members which are adapted to be anchored to the frame of the pickup truck.

4. The apparatus of claim 1 wherein said fixed framework comprises first and second facing flange frame members which comprise said frame guide means, and said frame members have affixed flanges and said flanges are adapted to clamp a roller mechanism.

5. The apparatus of claim 1 wherein said framework comprises frame members and bolt flanges extending therefrom.

6. The apparatus of claim 1 wherein said mounting means comprises a pair of edge defining slidably mounted rails, and said rails are provided with two ends each and the ends thereof support rollers; and further wherein said mounting means also includes upstanding reinforced gusset members supporting the nether side of a fifth wheel mechanism thereabove.

7. The apparatus of claim 1 wherein said releasable locking means is a spring loaded hook constructed and arranged to continuously hold said slidable mounting means, and further including upstanding lever means for releasing said hook on movement thereof, and further including means for positioning said lever for automatic engagement by the fifth wheel mechanism on excessive turning thereof.

8. The apparatus of claim 7 wherein said lever means includes cam means operated on movement of said lever means, said cam means moving said hook.

9. The apparatus of claim 8 wherein said hook is constructed with a tang engaging said slidable mounting means for locking and release.

10. The apparatus of claim 9 wherein said hook is sized to hold a mating surface on said slidable mounting means.

* * * * *